Oct. 6, 1959    H. J. EICHEL    2,907,682
ADHESIVE TAPE CONTAINING PRESSURE-RUPTURABLE CAPSULES
Filed May 28, 1958

INVENTOR
HERMAN J. EICHEL
HIS ATTORNEYS

United States Patent Office 2,907,682
Patented Oct. 6, 1959

2,907,682

ADHESIVE TAPE CONTAINING PRESSURE-RUPTURABLE CAPSULES

Herman J. Eichel, Dayton, Ohio, assignor to The National Cash Register Company, Dayton, Ohio, a corporation of Maryland Application May 28, 1958, Serial No. 738,274

4 Claims. (Cl. 117—122)

This invention relates to an adhesive tape consisting of a web having thereon a coating of interspersed pressure-rupturable microscopic capsules of two kinds, one kind of the capsules enclosing a liquid solvent, and the other kind of capsules enclosing a very viscous, non-flowing adhesive material which is substantially solid but which is soluble in the solvent carried by the first-named capsules.

In one form of the invention the encapsulation of the adhesive may be dispensed with, and the adhesive may be incorporated in the coating in finely-divided form.

In practice, the adhesive tape is applied to a receiving material, and pressure is applied to the uncoated side of the web to break the capsules, which, the capsules being interspersed, allows the solvent to come into contact with the adhesive and form a fluid which causes the tape to adhere to the receiving material, the solvent, upon drying by evaporation or adsorption, causing the adhesive material to resume its viscous and almost solid state, whereby the tape is firmly secured to the receiving material.

The capsules are microscopic in size, and preferably their walls are made of colorless film-forming hydrophilic colloid material, and the solvent and the adhesive also are colorless, so that the coating on the tape is, for all practical purposes, colorless. The coating which is applied to the tape, which, preferably, is of paper, may be as thin as .003 inch in thickness, so that, if the base tape be colorless or white, the coating is practically invisible.

Figure 1:
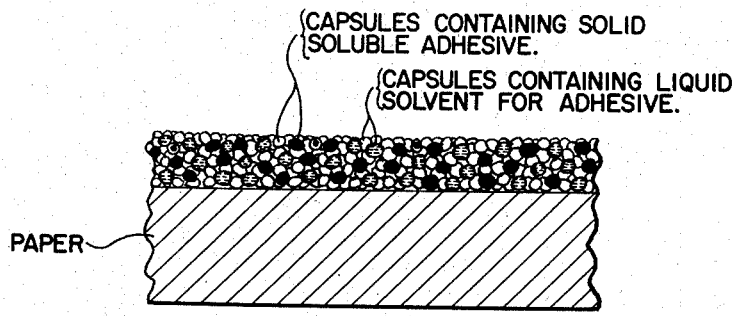
Figure 2:
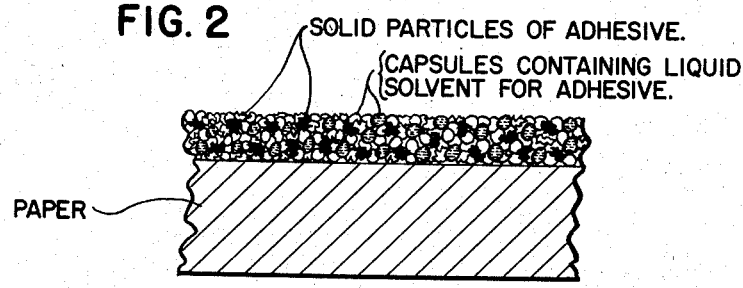

Of the drawing, which forms a part of the specification, Fig. 1 is a cross section of that form of the novel adhesive tape in which paper is coated with microscopic capsules, containing solid soluble adhesive, such capsules being interspersed with microscopic capsules containing a solvent for the adhesive, and Fig. 2 represents that form of the invention in which the adhesive is in the coating in finely divided form and only the solvent therefor is encapsulated. In both Figs. 1 and 2, some of the capsules are shown in full elevation behind those shown in section.

The adhesive-containing capsules may be made as follows: Dissolve five parts, by weight, of pigskin gelatin having its isoelectric point at pH8, in one hundred parts, by weight, of water, and mix therein one hundred and twenty parts, by weight, of a mixture of thirty-five parts, by weight, of chlorinated rubber of a viscosity, at room temperature (70 degrees Fahrenheit), of 125 centipoises; fifteen parts, by weight, of a polymerized rosin having a melting point of 208–217 degrees Fahrenheit; twenty parts, by weight, of hydro-abietyl phthalate; ten parts, by weight, of di-n-octyl-n-decyl phthalate; five parts, by weight, of chlorinated diphenyl having a specific gravity of 1.378–1.388; and forty parts, by weight, of chlorinated diphenyl having a specific gravity of 1.740–1.745 are dissolved in fifty parts, by weight, of toluene and stirred to form an emulsion. Next, prepare a sol consisting of five parts, by weight, of gum arabic in one hundred parts, by weight, of water. The gelatin emulsion is stirred into one half liter of water, and the gum arabic sol is mixed therein. This mixture is diluted with water to make one liter of emulsion with a pH of about 7. The pH of the mixture then is lowered to about 4.5 by the addition of fifteen percent acetic acid in water. Up to this point, the ingredients are kept at about 130 degrees Fahrenheit, which is above the gelling point of the gelatin. At this stage of the process of making the adhesive-containing capsules, the resultant gelatin-gum-arabic complex has been deposited as liquid capsule walls around the individual droplets of the adhesive mixture, which droplets at this point are also in liquid form, because of the heat and the pressure of the toluene solvent. By continuous stirring, these liquid-containing capsules are kept dispersed in the remaining aqueous phase until gelled and hardened. The hardening of the capsule walls is brought about by, first, cooling the dispersion to fifty degrees Fahrenheit and, then, introducing thereinto seven grams of twenty-five percent, by weight, of glutaraldehyde in water, the resulting mixture being allowed to remain under agitation for several hours. The resultant mixture of hardened capsules is then set aside while the solvent-containing capsules, next to be described, are made.

To make the solvent-containing capsules, 100 parts, by weight, of petroleum distillate, having a main boiling point of 175 degrees Fahrenheit, is emulsified in 222 parts, by weight, of eleven percent gelatin-in-water solution. To this is added 222 parts, by weight, of eleven percent gum-arabic-in-water solution. Water is added to the resultant mixture to bring it to a volume of 2,500 milliliters. The pH of the diluted mixture is reduced to 5 by the addition of a fifteen percent aqueous solution of acetic acid, with constant stirring, whereupon the gelatin-gum-arabic complex will deposit around the petroleum distillate droplets as a liquid phase, which is gelled and hardened, as has been explained in connection with the making of the adhesive-containing capsules.

The two dispersions of capsules are mixed together, and enough water is removed so that the viscosity of the fluid mixture is suitable for coating on the web. This coating is permitted to dry, and the tape is ready for use.

In use, the tape is laid over the surface to which it is to be applied, and pressure, sufficient to rupture the capsules, is applied, which pressure breaks open the solvent-containing capsules and the adhesive-containing capsules, the adhesive being rendered fluid by the solvent to cause adhesion of the tape to the receiving material. The solvent, evaporating or being absorbed, leaves the adhesive in a substantially solid state, firmly fastening the tape to the receiving material.

It is to be understood that the tape may be as wide as desired, and such wide tape may be cut into lengths to form adhesive sheets, and that narrow tape may be cut into short lengths to form adhesive labels. The invention is not to be deemed limited to the particular adhesive or encapsulating techniques involved, as the main feature of the invention is to have present in the coating an adhesive which is soluble in an evaporable solvent held physically insulated therefrom in the coating.

It is within the purview of the invention to have the coating consist of solvent-containing capsules and having the adhesive in a finely-divided form mixed among the solvent-containing capsules but not itself encapsulated. The natural tackiness of the fluid part of the capsule coating causes the finely-divided adhesive to adhere to the tape until dissolved by the rupture of the capsules and release of the solvent, which will cause the adhesive to become in condition for adhering the tape to the receiving material.

What is claimed is:

1. An adhesive tape having on a surface thereof a coating including two kinds of microscopic pressure-rupturable fluid-containing capsules, the two kinds of capsules being interspersed, one of the kinds of capsules containing a substantially solid adhesive material, and the other of the kinds of capsules containing a liquid solvent for the adhesive, whereby, upon the tape being applied to a receiving surface and pressure applied to the tape, the capsules of both kinds will be ruptured, creating a fluid adhesive to cause the tape to adhere to the receiving material.

2. The tape of claim 1 in which the solvent is volatile.

3. An adhesive tape having a surface thereof coated with solvent-containing pressure-rupturable microscopic capsules interspersed with finely-divided substantially solid adhesive material which is rendered fluid by the solvent.

4. The tape of claim 3 in which the solvent is volatile.

References Cited in the file of this patent

UNITED STATES PATENTS

| 1,769,627 | Fischer | July 1, 1930 |
| 2,730,456 | Green et al. | Jan. 10, 1956 |
| 2,800,457 | Green et al. | July 23, 1957 |

FOREIGN PATENTS

| 456,471 | Great Britain | Nov. 10, 1936 |